United States Patent
Song

(10) Patent No.: US 8,347,119 B2
(45) Date of Patent: Jan. 1, 2013

(54) SYSTEM AND METHOD FOR PROCESSOR UTILIZATION ADJUSTMENT TO IMPROVE DEEP C-STATE USE

(75) Inventor: Justin J. Song, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 12/459,199

(22) Filed: Jun. 26, 2009

(65) Prior Publication Data

US 2010/0332856 A1    Dec. 30, 2010

(51) Int. Cl.
*G06F 1/00* (2006.01)
*G06F 1/32* (2006.01)

(52) U.S. Cl. ........ 713/300; 713/320; 713/321; 713/323; 713/330; 712/229

(58) Field of Classification Search ................ 713/300, 713/320, 321, 323, 330; 712/229
See application file for complete search history.

(56) References Cited

U.S. PATENT DOCUMENTS

| | | | |
|---|---|---|---|
| 6,499,102 B1 | 12/2002 | Ewertz | |
| 2005/0108587 A1* | 5/2005 | Cooper et al. | 713/320 |
| 2006/0190635 A1 | 8/2006 | Kojou | |
| 2008/0148027 A1 | 6/2008 | Fenger et al. | |
| 2008/0189563 A1 | 8/2008 | Itkin | |

OTHER PUBLICATIONS

Office Action received for European Patent Application No. 10250627.6, mailed on Jan. 11, 2011, 2 pages of Office Action.
Extended European Search Report received for European Patent Application No. 10250627.6, mailed on Oct. 28, 2010, 5 pages.

* cited by examiner

*Primary Examiner* — Paul Yanchus, III
*Assistant Examiner* — Michael J Brown
(74) *Attorney, Agent, or Firm* — Joni D. Stutman

(57) ABSTRACT

In some embodiments, the invention involves modification of the processor utilization calculations that are used by operating system power management services to improve processor efficiency. An embodiment of the present invention is a system and method relating to power management policies under operating system control. In at least one embodiment, the present invention is intended to modify the processor utilization evaluation process so that C-state transition time and/or unhalted reference cycles are included in the calculation. Other embodiments are described and claimed.

14 Claims, 3 Drawing Sheets

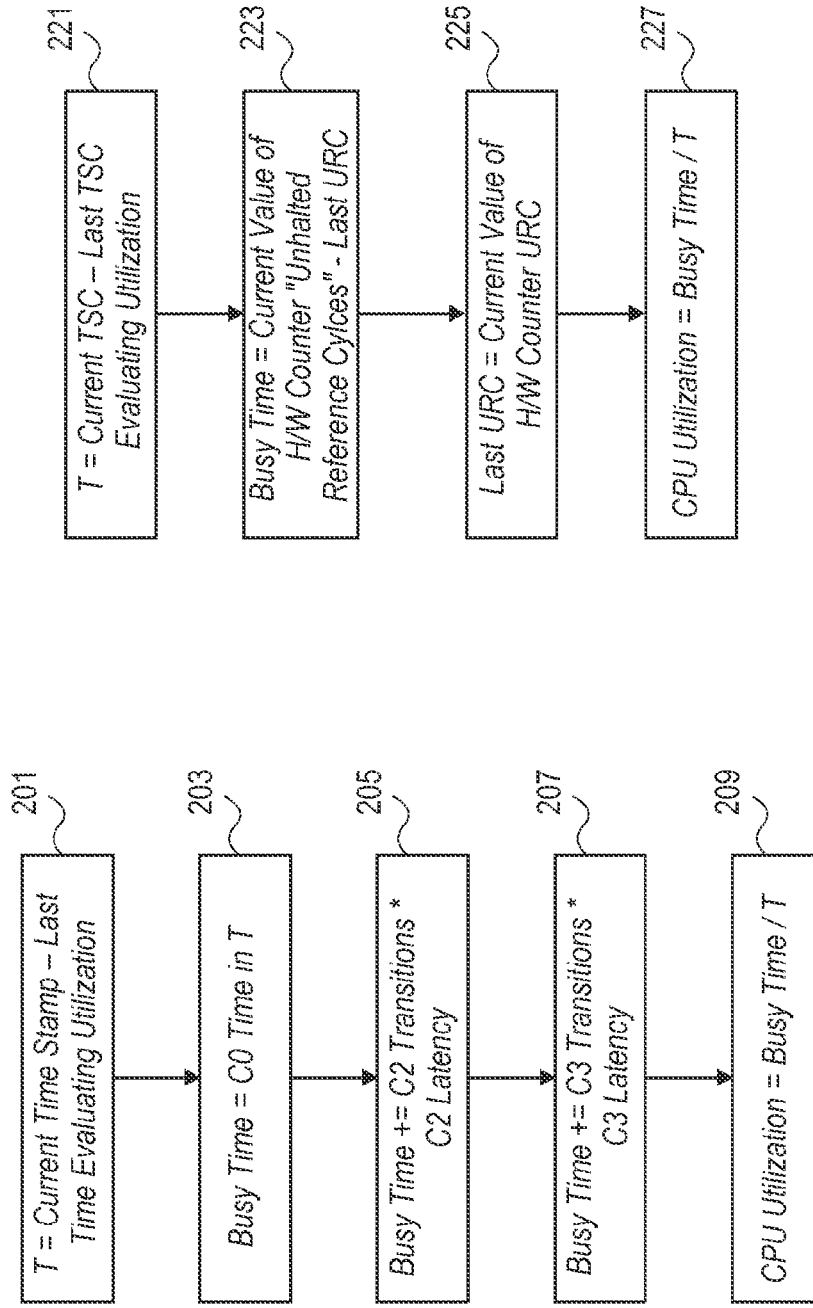
FIG. 1A / FIG. 1B

SYSTEM AND METHOD FOR PROCESSOR UTILIZATION ADJUSTMENT TO IMPROVE DEEP C-STATE USE

FIELD OF THE INVENTION

An embodiment of the present invention relates generally to power management policies for computing devices and, more specifically, to a modification to a legacy C-state power management policy which improves processor efficiency.

BACKGROUND INFORMATION

Various mechanisms exist for power management on a computing platform. Some methods are implemented at the platform or firmware level, and some are implemented at the operating system level. The Microsoft® Windows® operating system (OS) uses C-state power management features to control the power state of the processor during idle times.

Windows® OS C-state power management features a processor utilization based C-state selection algorithm. C-States processor power states are distinguishable from P-states. A P-State is a system performance state used when the system is not idle to select the processor frequency and voltage. The correct frequency and voltage may be selected to best handle the workload.

The P-state is only applicable when the processor is operating at C0. There are typically C-states from C0 to C9. For instance, C0 is used when the processor is not idle. When the processor has no work to do, other C-states may be entered. C1 state, for instance, disables the CPU clock. For some Intel Corp. platforms, C2 is not used by the processor; instead C2 may notify the chipset that the processor is idle. C3 flushes the L1 cache in multi-core processors to maintain lower power. It will be understood that latency for returning from C3 (a deeper C-state) is longer than if returning from C1 (a shallower C-state).

According to the *Advanced Configuration Power Interface Specification*, Revision 3.0b, Oct. 10, 2006, available at URL www*acpi*info/DOWNLOADS/ACPIspec30b.pdf, (where periods are replaced with asterisks in URLs in this document to avoid inadvertent hyperlinks), "to save power in the Working state, the OS puts the CPU into low-power states (C1, C2, and C3) when the OS is idle. In these low-power states, the CPU does not run any instructions, and wakes when an interrupt, such as the OS scheduler's timer interrupt, occurs. The OS determines how much time is being spent in its idle loop by reading the ACPI Power Management Timer. This timer runs at a known, fixed frequency and allows the OS to precisely determine idle time. Depending on this idle time estimate, the OS will put the CPU into different quality low-power states (which vary in power and latency) when it enters its idle loop."

For instance, when a processor is going to enter idle mode, an operating system policy is responsible for selecting a target C-state for the processor. The power management service of the OS evaluates the processor's utilization over a past period; if the utilization is higher than a threshold, the policy will select a one-step shallower C-state (called demotion) than the C-state selected for last idle; if the utilization is lower than a threshold, the policy will select a one-step deeper C-state (called promotion) than the C-state selected for last idle. The demotion/promotion threshold typically used by the Microsoft® Windows® OS is defined by the standard Advanced Configuration and Power Interface (ACPI) and shown in Table 1, below. The second column shows percentages indicating a utilization ratio counted over a period of time. The C-states are mapped to ACPI standard C-state. For instance, if the utilization is less than 50%, the OS will promote the C-state from C1 to C2. If the utilization is greater than 60% the OS will demote the C-state from C2 to C1. This policy works very well for a wide range of workloads until introduction of long latency C-states such as CC6 (core power gating). It will be understood that the CC6 C-state is mapped to the ACPI C3 C-state, as shown in the Table. For purposes of the following discussion, ACPI C-state standard notation will be used.

TABLE 1

| Windows ® C-State Policy Promotion/demotion Thresholds | |
|---|---|
| ACPI_C1_TO_C2_THRES | <50% |
| ACPI_C2_TO_C3_THRES | <40% |
| ACPI_C2_TO_C1_THRES | >60% |
| ACPI_C3_TO_C2_THRES | >60% |

The processor power states C0-C3 are defined in ACPI as follows:

C0 is the operating state.

C1 (often known as Halt) is a state where the processor is not executing instructions, but can return to an executing state quickly.

C2 (often known as Stop-Clock) is a state where the processor maintains all software-visible state, but may take longer to wake up.

C3 (often known as Sleep) is a state where the processor does not need to keep its cache coherent, so it is typically flushed, but maintains other state. Some processors may have variations on the C3 state that differ in how long it takes to wake the processor.

BRIEF DESCRIPTION OF THE DRAWINGS

The features and advantages of the present invention will become apparent from the following detailed description of the present invention in which:

FIG. 1A is a flow diagram illustrating an exemplary method for computing processor utilization based on BIOS CST, according to an embodiment of the invention;

FIG. 1B is a flow diagram illustrating an exemplary method for computing processor utilization for platforms implemented with a hardware counter for unhalted referenced cycles, according to an embodiment of the invention.

DETAILED DESCRIPTION

Figure 2A:
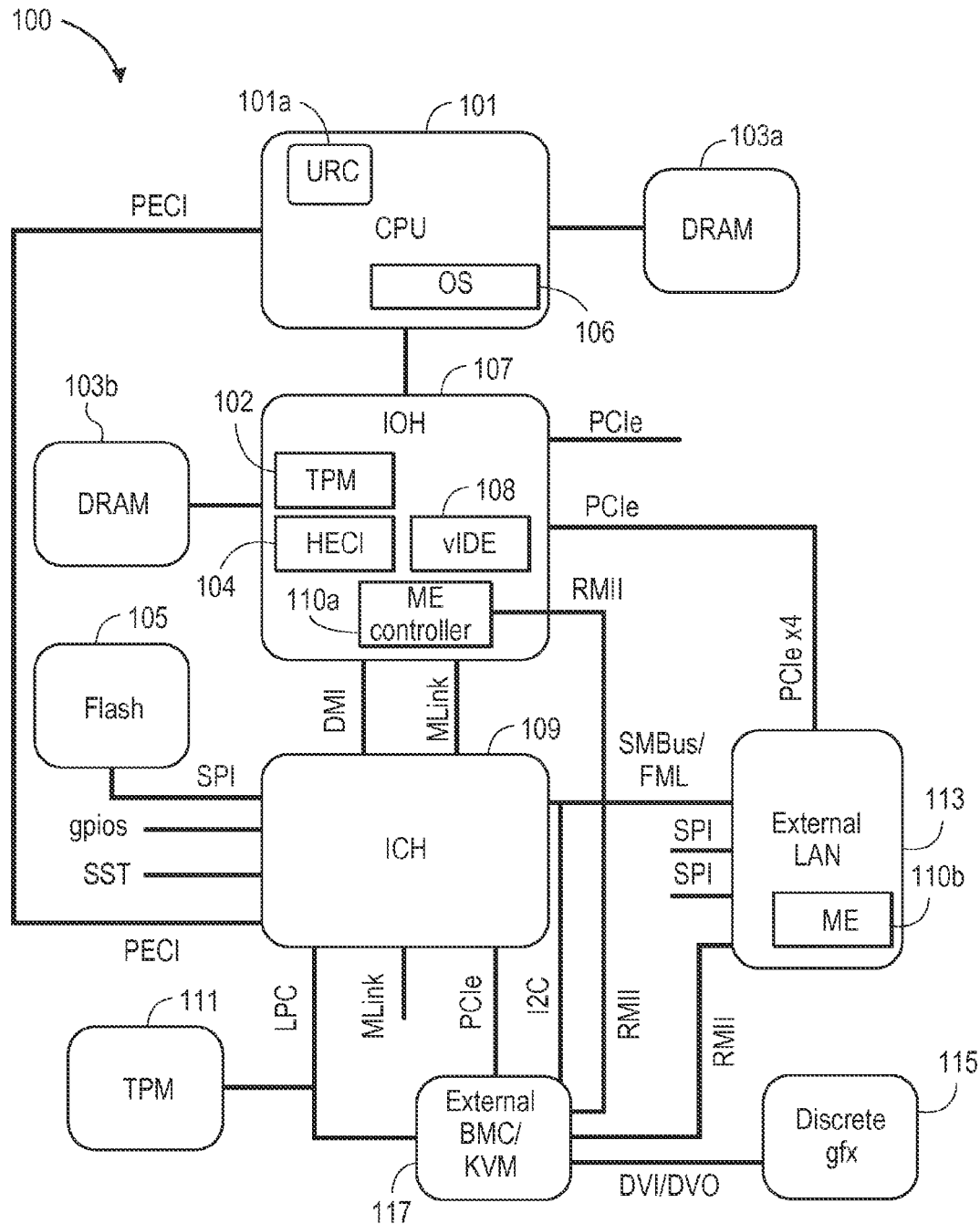
FIGS. 2A and 2B are block diagrams illustrating both exemplary server and client platforms which may be utilized in implementation of various embodiments of the invention.

An embodiment of the present invention is a system and method relating to power management policies under operating system control. In at least one embodiment, the present invention is intended to modify the processor utilization evaluation process so that C-state transition time and/or unhalted reference cycles are included in the calculation.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

The authors have found that the legacy operating system power management policy is not efficient for some workloads, such as with CC6 (core power gating). Utilizing a network benchmark tool, Chariot, available from NetIQ®, with small buffer size, the Windows® OS C-state policy chooses C6 state inappropriately, and may cause severe performance degradation of 30% to 200%. Due to this, sophisticated users and customers may disable deep C-states, altogether. Disabling deep C-states results in unnecessary increased power utilization.

One reason for this problem is that there may be approximately 20,000 idle break events per core, per second. Each time, a processor spends 60-70 microseconds exiting and entering C6 mode (ACPI C2 or C3 state, depending on hardware mapping)—just for processing one break event for 10-15 micro-seconds of idle time. If the processor always uses C1 mode (typical entry/exit latency is 1 microsecond), then this problem is gone. Unfortunately the Windows® OS C-state policy almost always selects C6, because only the 10-15 microsecond break-event processing is used by the OS for counting processor utilization. Thus, utilization appears low (20-34%), and so ACPI C3 (mapped to C6) is chosen.

The authors found similar problems with other workloads, such as NetPIPE and NetPERF, which are standard I/O benchmarks.

It is typically not possible for users to enable/disable deep C-state modes based on their application workloads, however, because (1) users are often not workload experts and they do not know which C-state is best; and (2) real world workloads change over time. So, once users are aware of significant performance degradation as discussed above, the most likely reaction is to set "no C-state" in their BIOS—in fact some PC/OS vendors may already disable deep C-states before shipping products due to the inefficiencies of the OS C-state calculations. When deep C-states are disabled, only C0 and C1 are enabled.

In embodiments of the invention, the processor utilization calculation is modified to correct for C-state transition time (both entry and exit). In existing systems, there may be significant under-estimation of utilization because transition times are not accounted for. The calculation modifications may be implemented differently depending on hardware capabilities of the platform. For instance, some platforms have processors supporting fixed counter "unhalted reference cycles." Processors that do not have this capability will use calculated transition times using (1) C-state latency values provided by BIOS or other firmware, and (2) C-state transitions provided by OS. During transition from C3, for instance, there are many interrupts, and wake up time may be long; no instructions may be retired.

Referring now to FIG. 1A, there is shown an exemplary method for computing processor utilization based on BIOS C-State (BIOS CST) latency, according to an embodiment of the invention. For deep C-states mapped to ACPI C2 and C3, the advertised latency in the BIOS CST object should be used. Each time a processor computes utilization, both the C0 (non-idle) time and number of transitions to C2/C3 multiplied by the C2/C3 transition latency times are used. C1 transition times are not added to the Busy Time, because this time is typically very small. It will be understood that if C-state definitions or latency times change in the future, either based on changing standards or improved hardware/software, then a choice may be made to include the latency times for a wider or narrow class of C-states.

In the example shown, first, the delta time, T, is computed as the current time stamp minus the last time evaluating utilization, in block 201. The Busy Time is reset to be the amount of time during period T that the processor is in C0, in block 203. The Busy Time is then incremented by the number of C2 transitions multiplied by the amount of C2 latency time, in block 205. Similarly, the Busy Time is then incremented by the number of C3 transitions multiplied by the amount of C3 latency time, in block 207. Now that the Busy Time has been calculated to include the transition times for each of C2 and C3 states occurring during the period, the processor utilization may be calculated as the Busy Time divided by time T, in block 209. Thus, more simply put, the processor utilization= (C0 time during past period+"C2 transitions"*"C2 latency"+ "C3 transitions"*"C3 latency")/period.

Existing systems running under the Windows® OS calculate the utilization by using the C0 time, or non-idle time, but not for each transition occurring in the time period. However, over a period of time, there may be many transitions. The existing policy ignores this fact, and for many workloads the policy may be inefficient. Thus, there is an advantage to counting the number of transitions among C-states and multiplying by the latency to acquire a more accurate utilization ratio. In an embodiment, the ACPI threshold portion of the policy remain the same. Thus, implementing this algorithm in existing operating systems requires only that the calculation of utilization ratios be replaced with the calculations discussed herein. Once the utilization ratio has been more accurately calculated, the percentage may be plugged into the existing functions for promotion and demotion.

For platforms supporting a fixed hardware counter for unhalted referenced cycles, this calculation may be somewhat simplified. The unhalted reference cycle counter includes all of the C0 time, plus all of the transition times in the period. Thus, it gives a more accurate reading of utilization, counted automatically by the hardware. Referring now to FIG. 1B, there is shown an exemplary method for computing processor utilization for platforms implemented with a hardware counter for unhalted referenced cycles, according to an embodiment of the invention. The delta time, T, or period, is calculated by tracking the current time stamp counter (TSC) and subtracting the last evaluating time TSC, in block 221. The Busy Time is then set to the current value of the hardware counter unhalted reference cycles (URC) minus the value of the URC counter of the last period, in block 223. The last URC counter is then set as the current URC counter to be used during the next period, in block 225. This historical counter may be stored in system memory, or in a dedicated register, or the like. Thus, the current value and the last (historical) value of the counter are saved to be used for calculation. The processor utilization is set to be the Busy Time divided by the period, in block 227. More simply, the processor utilization=delta of "unhalted reference cycle" since last computing/period.

It will be apparent that other methods may be used, including hybrid BIOS counters and hardware counters. As long as the latency and transition times are accounted for, the C-state policy will select a more efficient C-state. For instance, testing was performed using a prototype of an embodiment of the invention which resulted in the OS selecting C1 state for a Chariot model benchmark. Other workloads which were not break-event intensive, running under the SPECPower benchmark did not prevent pervasive use of C6 (ACPI C2 or C3), because processor utilization only increases a small amount due to the extra calculations required to determine more accurate utilization ratios. SPECpower_ssj2008 is an industry-standard benchmark that evaluates the power and performance characteristics of volume server class computers, available from the Standard Performance Evaluation Corporation (SPEC). Additional tests of the prototype on various processors available from Intel Corporation resulted in an overall 30-50 W power savings for the same work load.

Some newer processors available from Intel Corp. having a core microarchitecture, such as the Core i7, provide an auto demotion mechanism performed in the power control unit (PCU). Benchmarks of the prototype for this core i7 type processor, with auto demotion configured and enabled, resulted in improvement over the built in PCU policies alone.

Figure 2B:
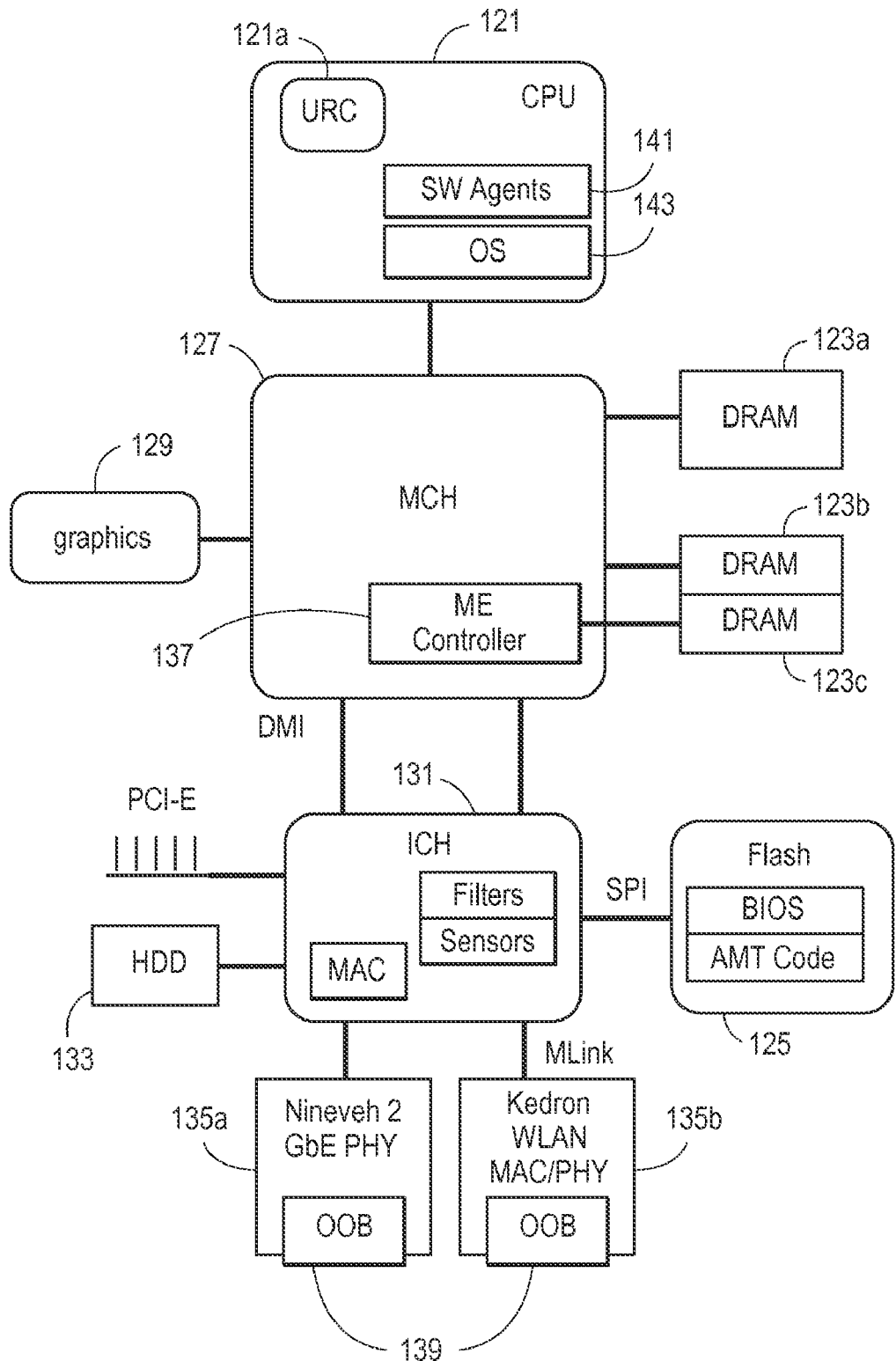

FIGS. 2A and 2B are block diagrams illustrating both exemplary server and client platforms which may be utilized in implementation of various embodiments of the invention. It will be understood that these figures are used for illustration only, and embodiments of the invention may be implemented on a variety of platform architectures.

Referring now to FIG. 2A, there is shown a block diagram illustrating an exemplary server platform, according to embodiments of the invention. In one server embodiment, a platform 100 comprises processor 101 communicatively coupled to DRAM 103a-b, an input/output Hub (IOH) 107, flash memory 105, and an input/output controller hub (ICH) 109. In this server embodiment, the north bridge (memory controller not shown) resides in the processor 101.

Processor 101 may be any type of processor capable of executing software, such as a microprocessor, digital signal processor, microcontroller, or the like. Though FIG. 2A shows only one such processor 101, there may be one or more processors in platform hardware 100 and one or more of the processors may include multiple threads, multiple cores, or the like.

The platform may have a trusted platform module (TPM) 111 and may be connected to an external LAN 113. The platform may also be coupled with a discrete graphics controller 115 via an external baseboard management controller (BMC) or keyboard-video-mouse (KVM) interface 117. KVM is a chip that allows multiplexing many possible local/remote keyboards/mice/video sources. In this exemplary embodiment, the IOH 107 may have additional components for TPM 102, host embedded controller interface (HECI) 104, virtual IDE (vIDE) 108, and micro-controller engine (ME) controller 110a. The HECI 104 is similar to a PCI device and is the means by which the basic input output system (BIOS) and operating system (OS) may communicate with the ME 110a. The micro-controller engine may also be known as a manageability engine, Intel® AMT or VPro™ device, for instance, available from Intel Corporation, for use with remote management of the platform. The vIDE 108 enables virtual indirection to a LAN 113. The external LAN 113 may also have a separate ME controller component 110b.

The ME controller 110a or 110b may program other chips on the platform via a number of buses and communication paths within the platform. The link between the processor 101 and the IOH 107 may comprise a point to point (pTp) interconnection link, quick path interconnect (QPI) or other communication interface. The memory controller hub (MCH), or north bridge, is typically built into the processor 101 for servers, and is not shown. In some embodiments, a PCIe bus will be directly connected to a die package, and hard drive (e.g. SSD) may also be directly connected to the die package.

The AMT code may reside in a protected portion of flash memory 105. This portion is inaccessible to the OS and firmware (BIOS/EFI). In some embodiments, there may be a BAR register in the ICH 109. Upon boot, the BIOS sets the register in the ICH 109 to define which portions of the flash are accessible to the BIOS and which portion is accessible only to the ME 110. If the ICH BAR register indicates that a portion of the flash is inaccessible to the BIOS, the memory will be unmappable and completely invisible and inaccessible to the firmware and OS. Other methods of sequestering portions of the memory via a hardware protection scheme may be devised and used by those of skill in the art.

An operating system 106 executes on the processor 101. The operating systems includes an OS power management (OSPM) service to initiate C-state promotion/demotion on the processor. In an embodiment, the BIOS firmware resides on the flash 105 and may serve to provide the OSPM with information needed for computing utilization, at startup. In another embodiment, a hardware register 101a on the processor 101 provides the OSPM with the unhalted reference cycle for use in calculating the utilization ratio.

FIG. 2B illustrates an exemplary client platform, according to embodiments of the invention. In an exemplary client embodiment, the platform comprises a processor 121 having possible software agents 141 and an operating system 143. The processor 121 may be communicatively coupled to DRAM 123a-c via a memory controller hub (MCH), or north bridge 127. The MCH 127 may communicate to a graphics interface 129 and an ICH 131. The ICH 131 may communicate with a hard disk drive (HDD) 133, flash memory 125 and one or more network interface devices 135a-b, for instance the Ninevah 2 Ethernet controller or the Kedron wireless LAN adapter, both available from Intel Corp. The network devices 135a-b may have an out-of-band (OOB) communications component 139. In this embodiment, the ME subsystem 137 may be built into the MCH 127. The flash memory 125 comprises the firmware code (BIOS), protected AMT code and manufacturer settings. It will be apparent to one of skill in the art that processors 101 and 121 may comprise single or multi-processors and/or may have more than one core.

The embodiment shown in FIG. 2B may operate in a similar manner as that shown in FIG. 2A. Both embodiments may utilize a manageability engine (ME) 110, 137 to store and retrieve boot scripts in a protected memory, for instance flash 105, 125.

An operating system 143 executes on the processor 121. The operating systems includes an OS power management (OSPM) service to initiate C-state promotion/demotion on the processor. In an embodiment, the BIOS firmware resides on the flash 125 and may serve to provide the OSPM with information needed for computing utilization, at startup. In another embodiment, a hardware register 121a on the processor 121 provides the OSPM with the unhalted reference cycle for use in calculating the utilization ratio.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for efficient power management, comprising:
    a processor having a plurality of possible idle states, the processor coupled to system memory and firmware memory store, wherein transitioning to and from an idle state takes a measured amount of time;
    an operating system configured to execute on the processor, the operating system comprising a power management service to control the plurality of idle states of the processor, wherein the power management service is configured to select a processor idle state based on a calculated utilization ratio and a predetermined ratio threshold policy, and wherein the calculated utilization ratio is determined by a sum of non-idle time, idle state transition times and idle state latency times for a predetermined period of time,
    wherein the utilization ratio is calculated as equal to a ratio of busy time to the period, which is busy time divided by period, where busy time is calculated as a sum of: (time in a non-idle state in the period), (a quantity of first idle state transitions multiplied by a latency time for the first idle state) and (a quantity of second idle state transitions multiplied by latency time for the second idle state), and
    wherein the busy time further comprises adding additional idle states and additional idle state transition times, when transition time for the additional idle states in not insignificant.

2. The system as recited in claim 1, wherein the idle states are standard processor power states known as C-states, as defined by a legacy Advanced Power Configuration Interface Specification.

3. The system as recited in claim 1, wherein the non-idle time, idle state transition times and idle state latency times are stored in a hardware register as unhalted reference cycles and the power management service is configured to retrieve the unhalted reference cycles value to be used with the period to determine the utilization ratio.

4. The system as recited in claim 1, wherein the firmware is configured to calculate a number of idle state transitions occurring in the period.

5. A method for efficient power management for a processor, comprising:
    retrieving, by an operating system power management agent, busy time information for a time period, T, wherein busy time comprises non-idle processor time and transition and latency times for idle states during the period;
    calculating a utilization ratio of busy time divided by the period; and
    selecting a processor performance state based on the utilization ratio and a predetermined ratio threshold policy when the processor is idle,
    wherein the busy time is calculated as equal to a sum of: (time in a non-idle state in the period), (a quantity of first idle state transitions multiplied by a latency time for the first idle state) and (a quantity of second idle state transitions multiplied by latency time for the second idle state), and wherein the busy time further comprises adding additional idle states and additional idle state transition times, when transition time for the additional idle states in not insignificant.

6. The method as recited in claim 5, wherein the processor performance state is selected from a group of C-States, C0, C1, C2, and C3, defined by an advanced configuration and power interface standard.

7. The method as recited in claim 5, wherein the non-idle time, idle state transition times and idle state latency times are stored in a hardware register as unhalted reference cycles, further comprising retrieving by the power management agent the unhalted reference cycles value to be used with the period to determine the utilization ratio.

8. A method for efficient power management for a processor, comprising:

retrieving, by an operating system power management agent, busy time information for a time period, T, wherein busy time comprises non-idle processor time and transition and latency times for idle states during the period;

calculating a utilization ratio of busy time divided by the period; and selecting a processor performance state based on the utilization ratio and a predetermined ratio threshold policy when the processor is idle, wherein at least one of a firmware service and an operating system agent is configured to calculate a number of idle state transitions for n idle states occurring in the period, further comprising:

multiplying the number of idle state transitions for an $n^{th}$ idle state with a transition time for the $n^{th}$ idle state for each of n idle states to be included in the busy time calculation with the non-idle time, wherein an idle state is included when a corresponding transition time for the idle state is not insignificant.

9. A non-transitory computer readable storage medium having instructions stored thereon, the instructions when executed by a processor cause the processor to:

retrieve, by an operating system power management agent, busy time information for a time period, T, wherein busy time comprises non-idle processor time and transition and latency times for idle states during the period;

calculate a utilization ratio of busy time divided by the period; and select a processor performance state based on the utilization ratio and a predetermined ratio threshold policy when the processor is idle, wherein the busy time is calculated as equal to a sum of: (time in a non-idle state in the period), (a quantity of first idle state transitions multiplied by a latency time for the first idle state) and (a quantity of second idle state transitions multiplied by latency time for the second idle state), and wherein the busy time calculations further comprise instructions to add additional idle states and additional idle state transition times, when transition time for the additional idle states in not insignificant.

10. The medium as recited in claim 9, wherein the processor performance state is selected from a group of C-States, C0, C1, C2, and C3, defined by an advanced configuration and power interface standard.

11. The medium as recited in claim 9, wherein the non-idle time, idle state transition times and idle state latency times are stored in a hardware register as unhalted reference cycles, further comprising instructions to retrieve by the power management agent the unhalted reference cycles value to be used with the period to determine the utilization ratio.

12. A non-transitory computer readable storage medium having instructions stored thereon, the instructions when executed by a processor cause the processor to:

retrieve, by an operating system power management agent, busy time information for a time period, T, wherein busy time comprises non-idle processor time and transition and latency times for idle states during the period;

calculate a utilization ratio of busy time divided by the period; and select a processor performance state based on the utilization ratio and a predetermined ratio threshold policy when the processor is idle, wherein at least one of a firmware service and an operating system agent is configured calculate a number of idle state transitions for n idle states occurring in the period, further comprising instructions to:

multiply the number of idle state transitions for an $n^{th}$ idle state with a transition time for the $n^{th}$ idle state for each of n idle states to be included in the busy time calculation with the non-idle time, wherein an idle state is included when a corresponding transition time for the idle state is not insignificant.

13. A system for efficient power management, comprising:

a processor having a plurality of possible idle states, the processor coupled to system memory and firmware memory store, wherein transitioning to and from an idle state takes a measured amount of time;

an operating system power management agent configured to execute on the processor, the operating system power management agent comprising a power management service to control the plurality of idle states of the processor, wherein the power management service is configured to:

determine busy time information for a time period, T, wherein busy time comprises non-idle processor time and transition and latency times for idle states during the period including multiplying the number of idle state transitions for an $n^{th}$ idle state with a transition time for the $n^{th}$ idle state for each of n idle states to be included in a busy time calculation with the non-idle time, wherein an idle state is included when a corresponding transition time for the idle state is not insignificant, calculate a utilization ratio of busy time divided by the period T, and select a processor performance state based on the utilization ratio and a predetermined ratio threshold policy when the processor is idle, wherein at least one of a firmware service and an operating system agent is configured to calculate a number of idle state transitions for n idle states occurring in the period.

14. The system as recited in claim 13, wherein the non-idle processor time, idle state transition times and idle state latency times are stored in a hardware register as unhalted reference cycles, further comprising retrieving by the power management agent the unhalted reference cycles value to be used with the period to determine the utilization ratio.

* * * * *